(12) United States Patent
Soni et al.

(10) Patent No.: US 11,391,576 B2
(45) Date of Patent: Jul. 19, 2022

(54) SYSTEM AND METHOD FOR GENERATING MAP DATA OF A REGION

(71) Applicant: HERE Global B.V., Eindhoven (NL)

(72) Inventors: Abhilshit Soni, Gujarat (IN); Ashish Dhiman, Himachal Pradesh (IN); Mohit Agarwal, Madhya Pradesh (IN)

(73) Assignee: HERE GLOBAL B.V., Eindhoven (NL)

( * ) Notice: Subject to any disclaimer, the term of this patent is extended or adjusted under 35 U.S.C. 154(b) by 157 days.

(21) Appl. No.: 16/700,649

(22) Filed: Dec. 2, 2019

(65) Prior Publication Data

US 2021/0164787 A1 Jun. 3, 2021

(51) Int. Cl.
*G01C 21/32* (2006.01)

(52) U.S. Cl.
CPC .................... *G01C 21/32* (2013.01)

(58) Field of Classification Search
CPC ..................................... G01C 21/32
USPC ............................................. 702/5
See application file for complete search history.

(56) References Cited

U.S. PATENT DOCUMENTS

| 6,850,841 | B1 | 2/2005 | Casino | |
| 2015/0117723 | A1* | 4/2015 | Joshi | G06V 10/44 382/113 |
| 2017/0116477 | A1 | 4/2017 | Chen et al. | |
| 2019/0130182 | A1* | 5/2019 | Zang | G06K 9/00651 |
| 2019/0243372 | A1* | 8/2019 | Huval | G05D 1/0214 |
| 2019/0360830 | A1* | 11/2019 | Chien | G01C 21/3476 |
| 2020/0202708 | A1* | 6/2020 | Fowe | G01C 21/32 |
| 2021/0042724 | A1* | 2/2021 | Rathod | H04W 4/029 |

FOREIGN PATENT DOCUMENTS

| EP | 2387017 A2 | 11/2011 |
| JP | 2010128732 A | 6/2010 |

OTHER PUBLICATIONS

Gao et al., "Moving Vehicle Information Extraction From Single-pass Worldview-2 Imagery Based on Ergas-sns Analysis", Article, Jul. 16, 2014, pp. 6500-6523.

Qu et al., "Vehicle Detection in Satellite Images by Incorporating Objectness and Convolutional Neural Network", Journal of Industrial and Intelligent Information vol. 4, No. 2, Mar. 2016, pp. 158-162.

* cited by examiner

*Primary Examiner* — Ricky Go
(74) *Attorney, Agent, or Firm* — Ditthavong, Steiner & Mlotkowski

(57) ABSTRACT

The invention provides a system, a method, and a computer programmable product for generating map data of a region. The method comprises obtaining image data of the region. The method further comprises determining, based on the image data, a plurality of road objects corresponding to at least one road segment associated with the region. The method further comprises generating at least one cluster of road objects corresponding to the at least one road segment, based on the plurality of road objects. The method further comprises generating the map data of the region based on the at least one cluster of road objects.

16 Claims, 11 Drawing Sheets

| LANE DATA | | |
| --- | --- | --- |
| Side of lane with respect to road segment | Left side of the road segment | Right of the road segment |
| Number of lanes | 5 | 5 |
| Lane width | 4m | 4m |
| Traversing direction | North | South |

SYSTEM AND METHOD FOR GENERATING MAP DATA OF A REGION

TECHNOLOGICAL FIELD

An example embodiment of the present invention generally relates to mapping and navigation applications, and more particularly relates to a system, a method, and a computer programmable product for generating map data of a region.

BACKGROUND

Various navigation applications are available to provide assistance (for example, directions) for driving, walking, or other modes of travel. Web-based systems and mobile app-based systems offer navigation applications that allow a user to request directions from a source location to a destination location. Generally, the navigation application provides the navigation assistance using map data which comprises lane data. Further, the lane data comprises lane geometry which is helpful for several reasons such as navigating various types of vehicles such as manual vehicles, autonomous vehicles, or semi-autonomous vehicles. The lane geometry may provide information such as number of lanes, traffic data of the vehicles, lane center lines. However, in context of autonomous vehicles, if the lane geometry is inaccurate and unreliable then unforeseen circumstances can be seen such as an accident.

Map developers and navigation service providers face many challenges in determining accurate and reliable lane data of the road. Currently, the lane data is determined based on probe data and aerial imagery. But, due to inherent GPS signal error of the probe data, interruptions due to high rise buildings and limited coverage of aerial imagery, the lane data may be inaccurate and unreliable for providing accurate navigation assistance. The lane data may also be determined based on street imagery or LiDAR data captured by a vehicle traversing on a road. However, it requires a huge capital for obtaining street imagery or LiDAR data. Accordingly, there is need for a system to provide, the lane data accurately with less cost to enable seamless commuting of the vehicles on the road.

BRIEF SUMMARY

Accordingly, there is a need for generating accurate and reliable lane data so as to realize a feasible, scalable, accurate and reliable mapping platform that can be used for providing high quality navigation assistance.

A system, a method, and a computer program product are provided in accordance with an example embodiment described herein for generating map data associated with a road segment of a region.

Embodiments disclosed herein may provide a system for generating map data associated with a road segment of the region. The system may include a memory configured to store instructions, and one or more processors configured to execute the instructions to at least: obtain image data of the region, determine, based on the image data a plurality of road objects corresponding to at least one road segment, generate at least one cluster of road objects corresponding to the at least one road segment based on the plurality of road objects, and generate the map data of the region based on the at least one cluster of the plurality of road objects.

According to one embodiment, to determine the plurality of road objects, the one or more processors are further configured to determine a plurality of mobile road objects from the plurality of road objects on the at least one road segment based on at least one object detection technique.

According to one embodiment, to generate the at least one cluster, the one or more processors are configured to determine a centre point of each of the plurality of road objects.

According to one embodiment, to generate the at least one cluster, the one or more processors are configured to plot the centre point of each of the plurality of road objects on an axis that is orthogonal with respect to the at least one direction of travel associated with the at least one road segment.

According to one embodiment, the at least one cluster is generated from the plotted centre point of each of the plurality of road objects based on a clustering algorithm.

According to one embodiment, the one or more processors are further configured to determine a lane count associated with the at least one road segment based on a count of the at least one cluster.

According to one embodiment, the map data comprises lane data associated with at least one lane of the road segment.

According to one embodiment, to generate the map data, the one or more processors are further configured to determine a mean value of the at least one cluster, determine a centre line corresponding to the mean value of each of the at least one cluster, each centre line corresponds to a respective lane centerline of the road segment, and determine a width of each respective lane based on the corresponding centre line.

According to one embodiment, the one or more processors are further configured to determine a front portion of the plurality of mobile road objects, and determine a direction of travel of the respective lane associated with the road segment based on direction of front portion of the plurality of moving objects traversing on the respective lane.

According to one embodiment, the lane data associated with at least one lane of the road segment comprise at least one of the centre line of the at least one lane, the width of the at least one lane, or a direction of travel of the at least one lane.

Embodiments of the disclosure may provide a method for generating map data of a region. The method comprises obtaining image data of the region, determining based on the image data the plurality of road objects corresponding to at least one road segment associated with the region, generating at least one cluster of the plurality of road objects corresponding to the at least one road segment based on the plurality of road objects and generating the map data of the region based on the at least one cluster of the plurality of road objects.

Embodiments of the disclosure provide a computer program product comprising at least one non-transitory computer-readable storage medium having stored thereon computer-executable program code instructions which when executed by a computer, cause the computer to carry out operations for generating map data of a region, the operations comprising obtaining image data of the region, determining based on the image data a plurality of road objects corresponding to at least one road segment associated with the region, generating at least one cluster of the plurality of road objects corresponding to the at least one road segment based on the plurality of road objects and generating the map data of the region based on the at least one cluster of road objects.

BRIEF DESCRIPTION OF THE DRAWINGS

Figure 1:
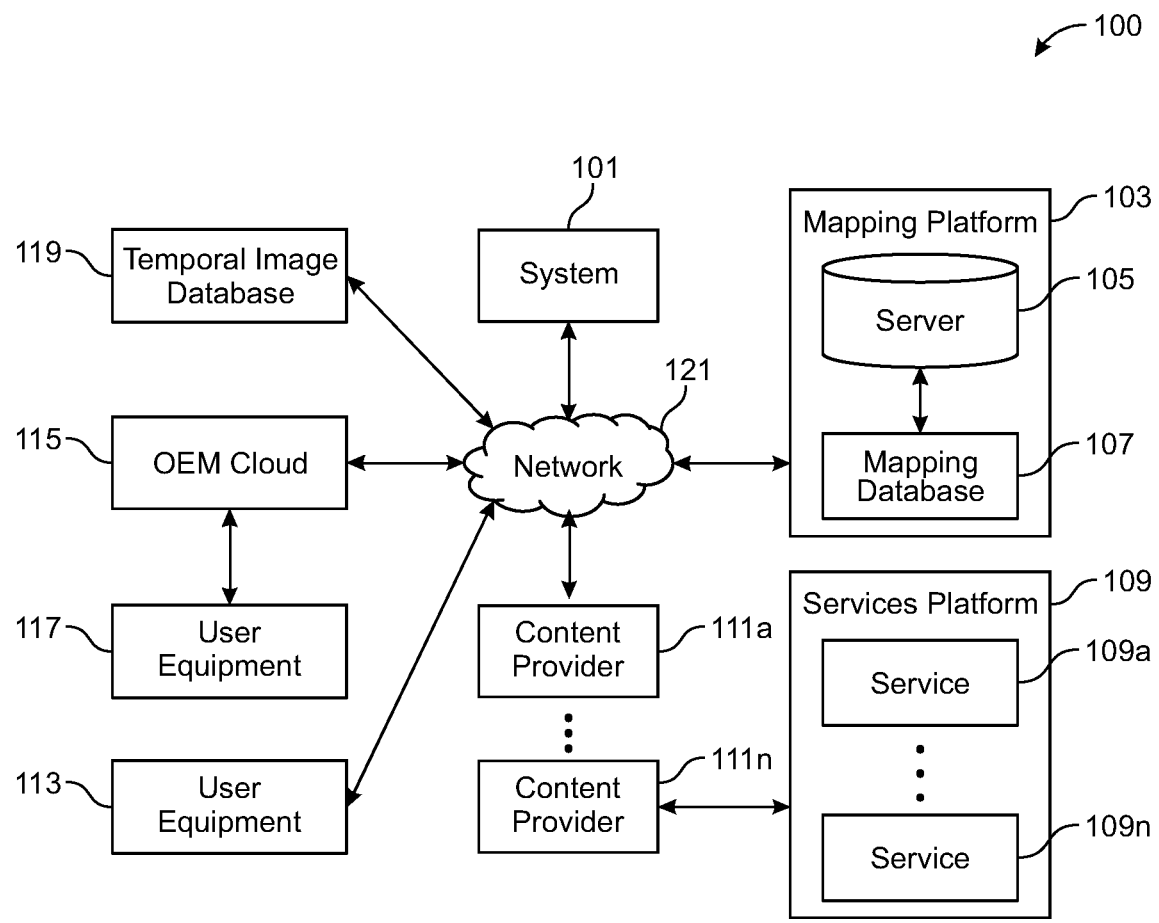
Figure 2:
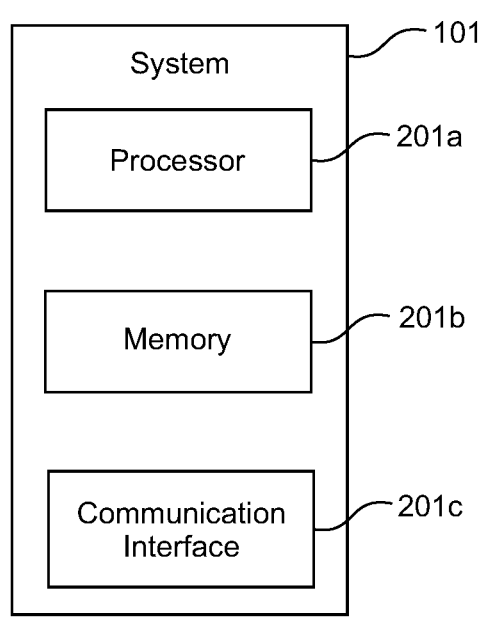
Figure 3A:
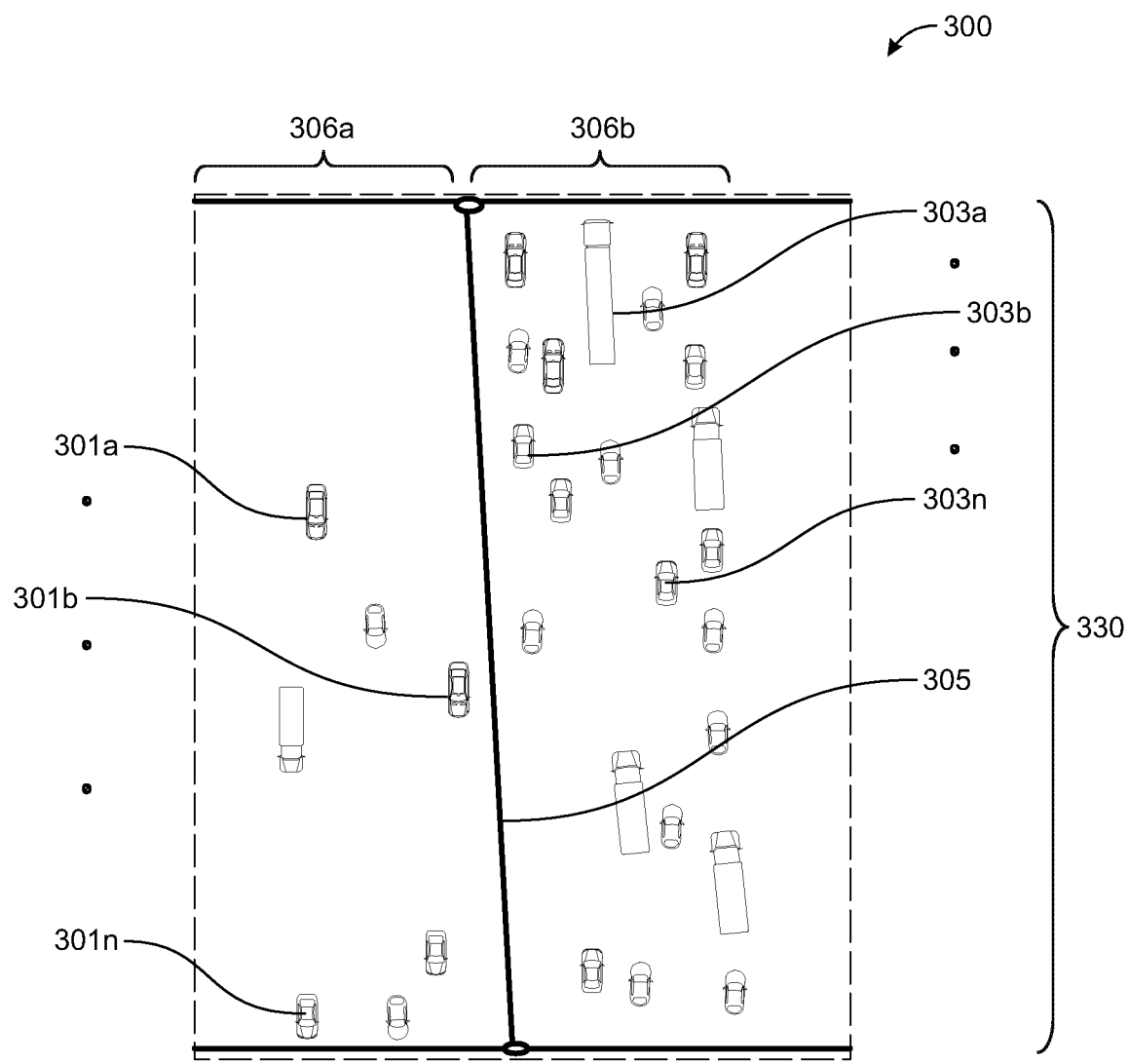
Figure 3B:
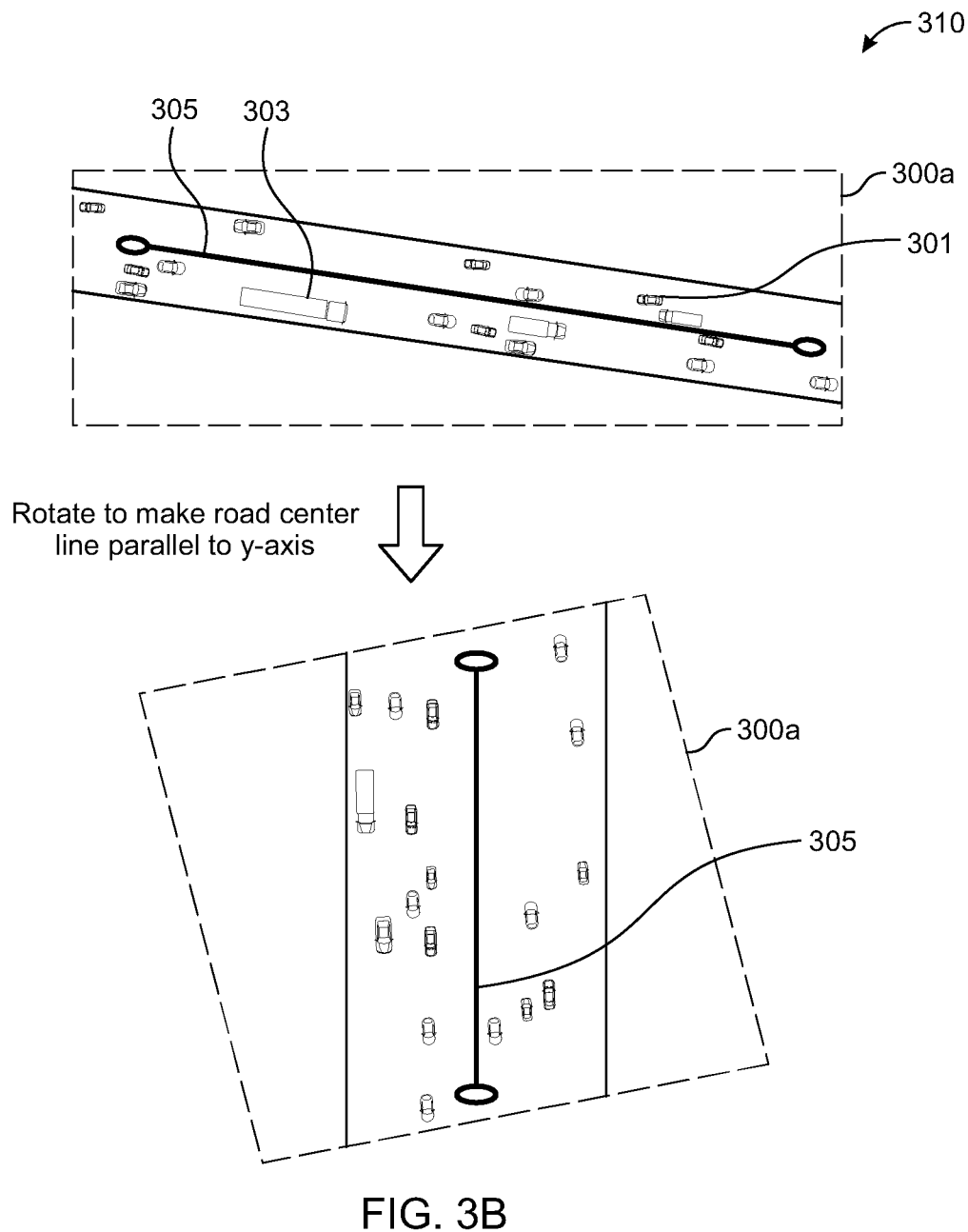
Figure 3C:
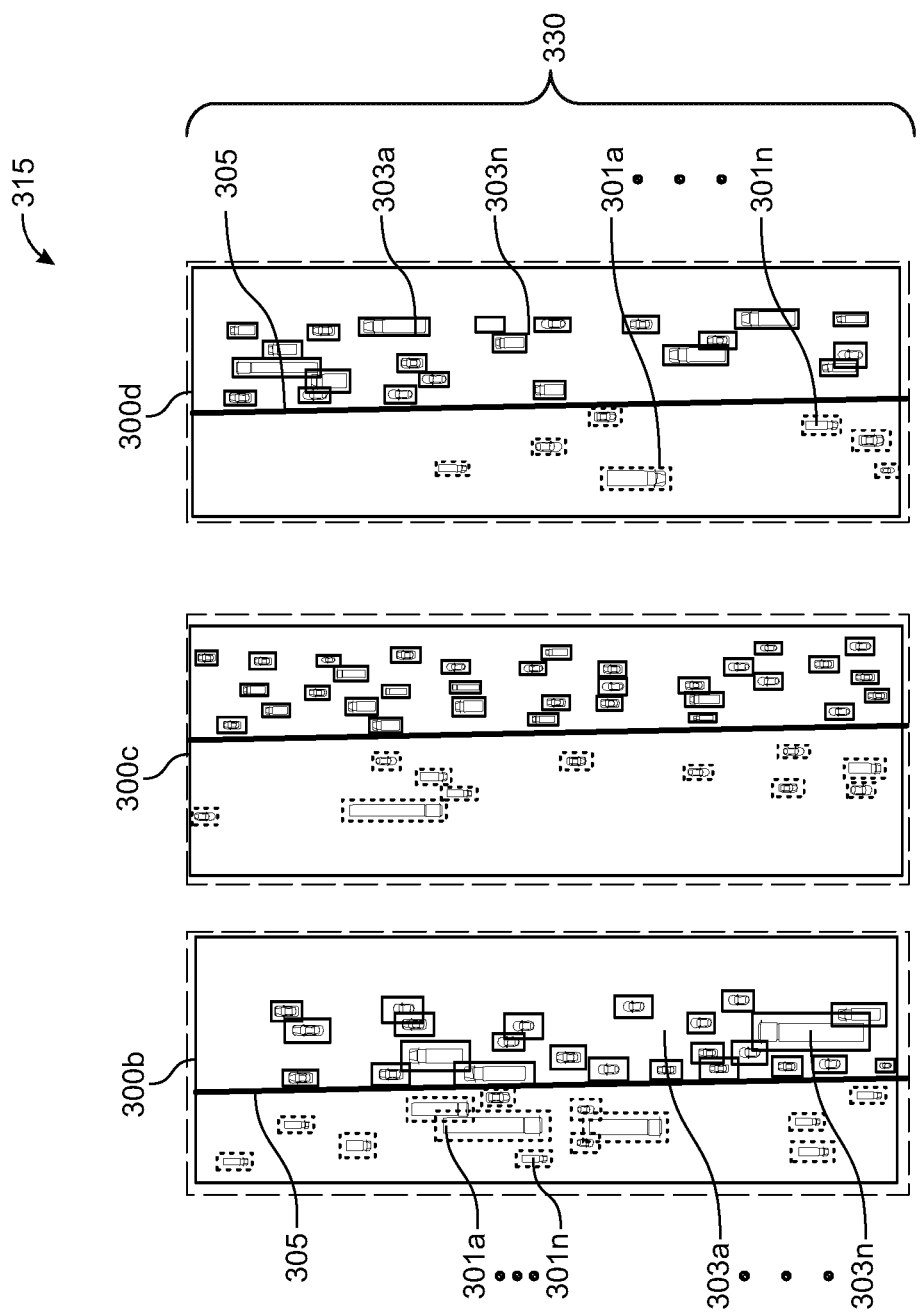
Figure 3D:
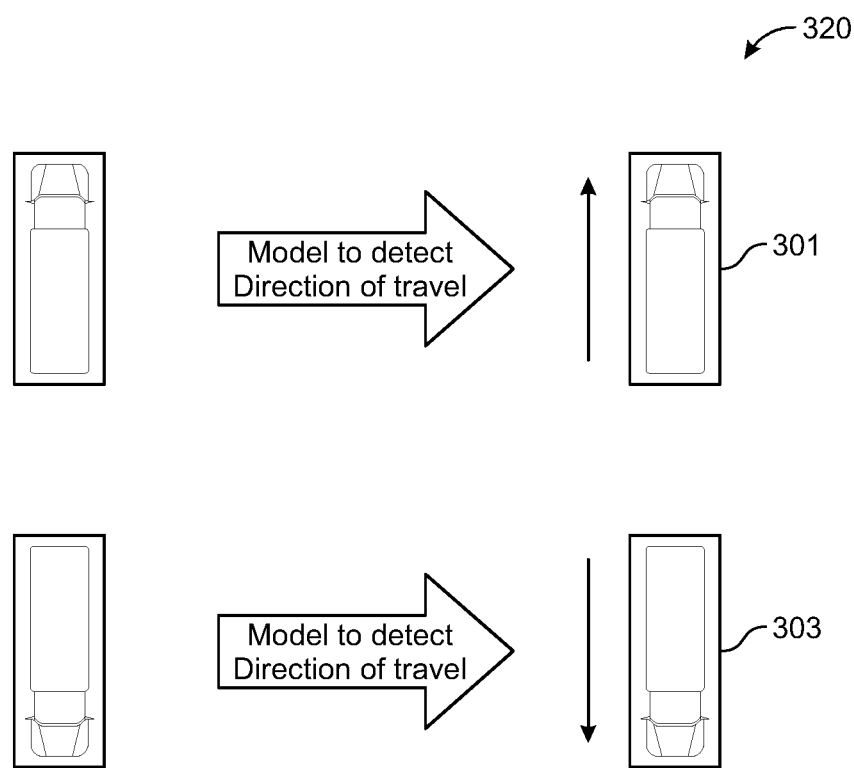
Figure 3E:
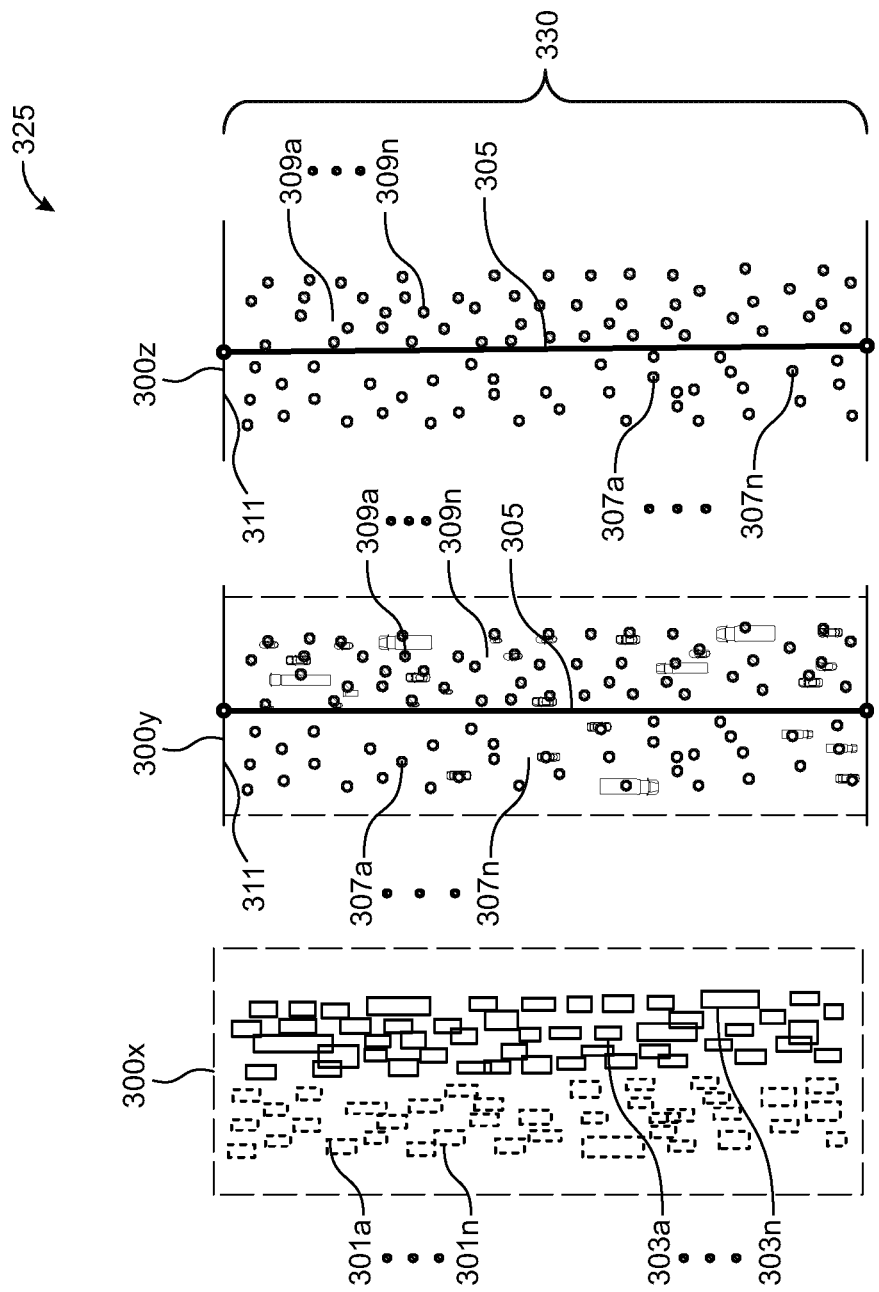
Figure 4:
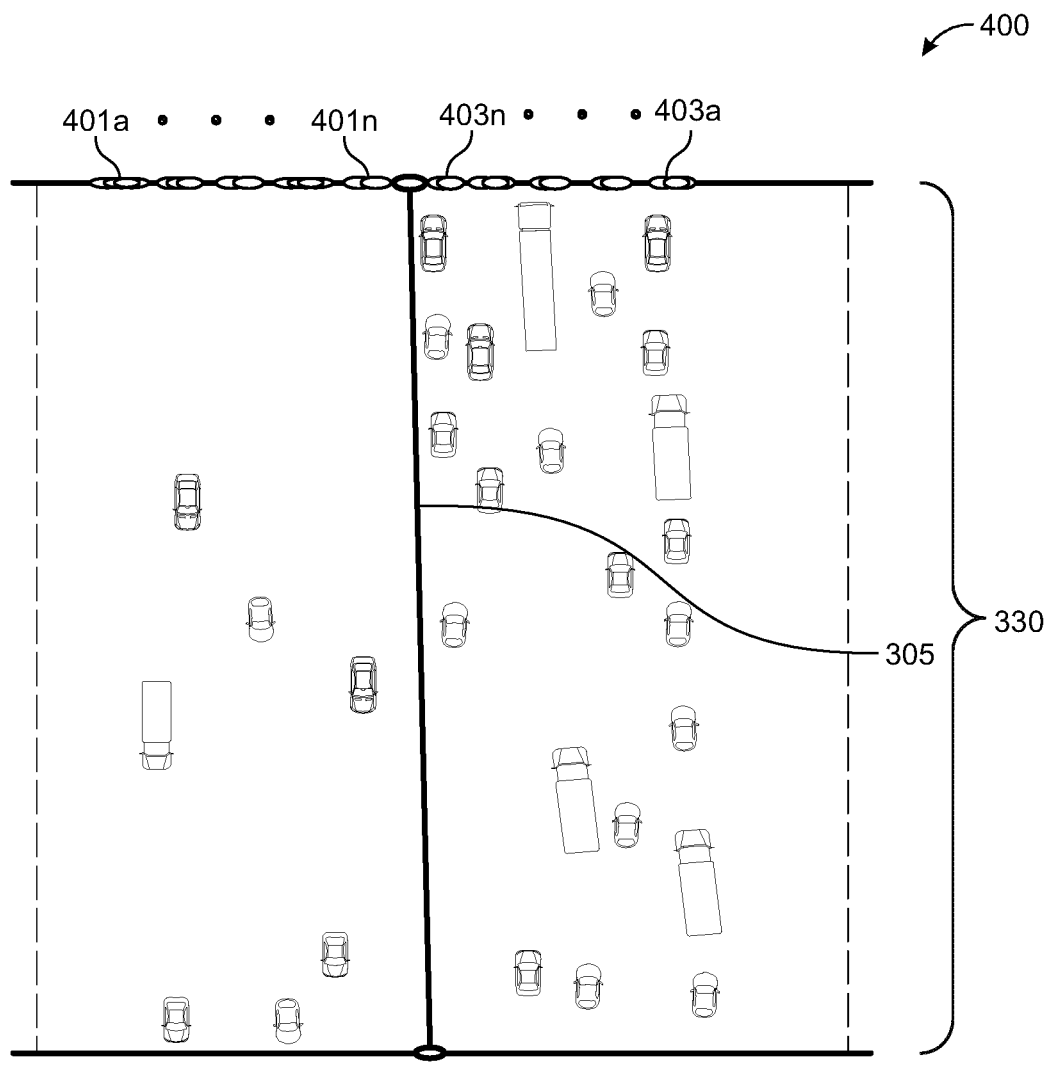
Figure 5:
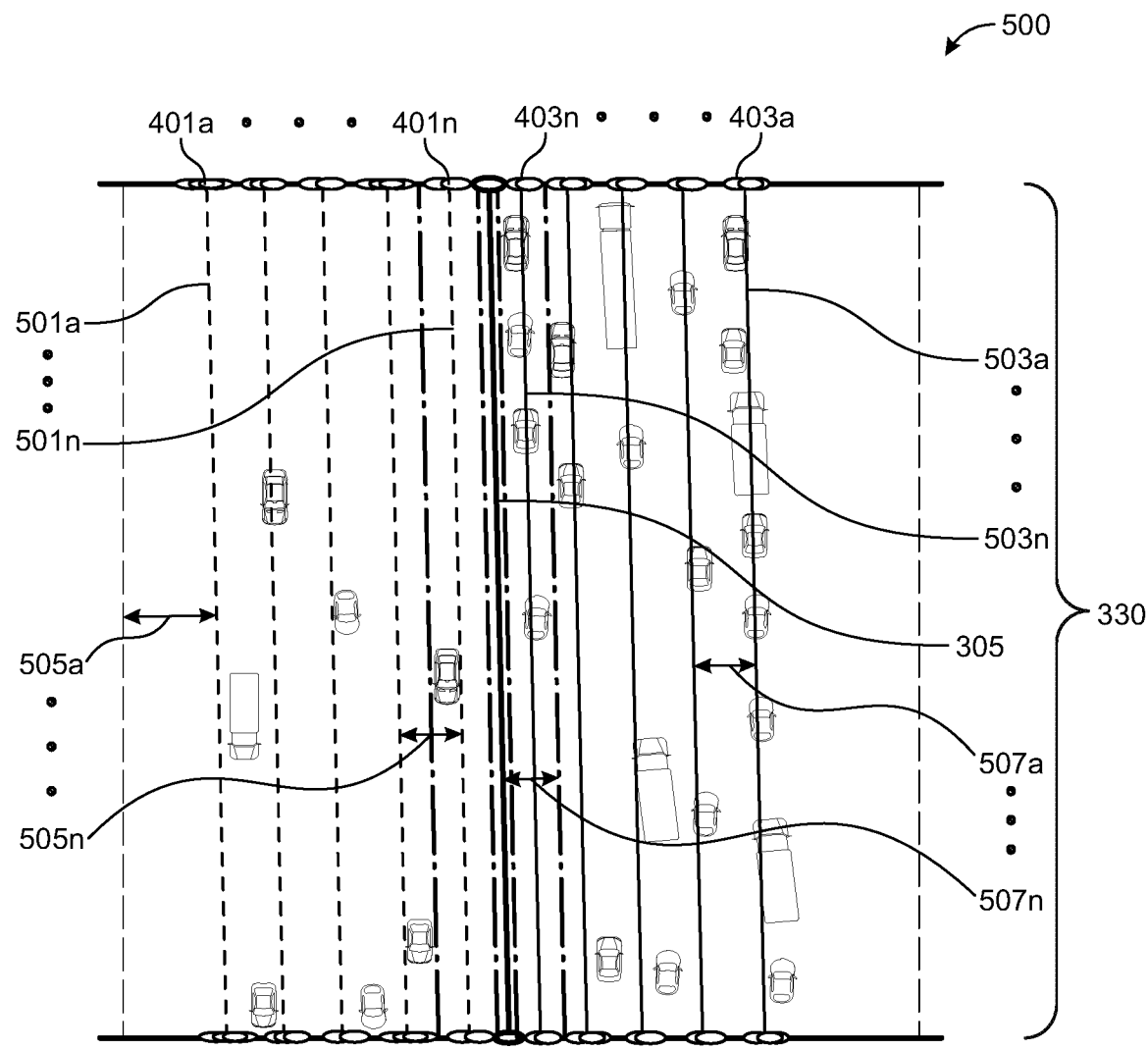
Figure 7:
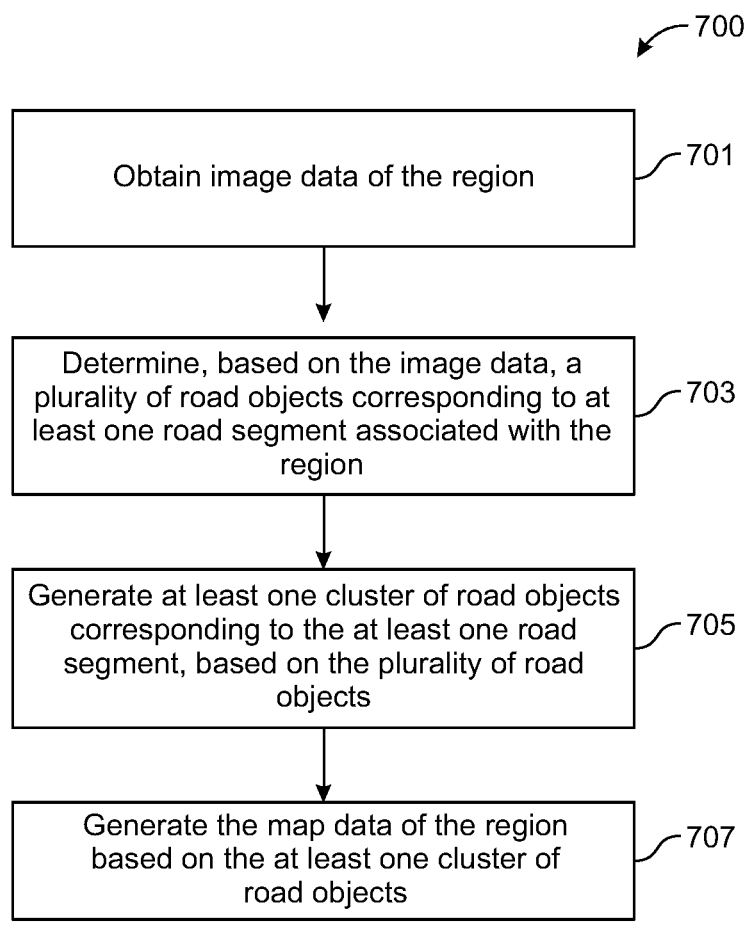

Having thus described example embodiments of the invention in general terms, reference will now be made to the accompanying drawings, which are not necessarily drawn to scale, and wherein:

FIG. 1 illustrates a schematic diagram of a network environment of a system for generating map data of a region, in accordance with an example embodiment;

FIG. 2 illustrates a block diagram of the system for generating the map data of the region, in accordance with an example embodiment;

FIG. 3A illustrates exemplary representations of the road segment, in accordance with an example embodiment;

FIG. 3B illustrates an exemplary scenario depicting implementation of the system to rotate an image of the road segment associated with the region, in accordance with an example embodiment;

FIG. 3C illustrates exemplary representation a plurality of exemplary temporal images of road segment associated with the region at different time instants, in accordance with an example embodiment of the present disclosure;

FIG. 3D illustrates an exemplary scenario depicting implementation of the system to determine traversing direction of the road objects in the road segment, in accordance with an embodiment of the disclosure;

FIG. 3E illustrates exemplary scenario depicting implementation of the system to convert the road objects into their respective center points, in accordance with an embodiment of the disclosure;

FIG. 4 illustrates an exemplary scenario for implementation of the system to generate at least one cluster associated with the plurality of road objects in the road segment, in accordance with an example embodiment;

FIG. 5 illustrates an exemplary scenario for implementation of the system to generate center lines associated with the lanes associated with the road segment of the region, in accordance with an example embodiment;

FIG. 6 illustrates an exemplary representation of the lane data generated by the system, in accordance with an example embodiment; and FIG. 7 illustrates a flowchart for implementation of an exemplary method for generating the map data of the region, in accordance with an example embodiment.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "road objects" may refer to vehicles, hawkers, or pedestrians traversing on a road. The vehicles may include but not limited autonomous vehicles, manual vehicles or semi-autonomous vehicles.

The term "road segment" may refer to a portion of a road associated with a region.

The term "centre line of the road segment" may refer to a line representing the physical center or physical divider of a road segment.

The term "autonomous vehicle" may refer to any vehicle having autonomous driving capabilities at least in some conditions. The autonomous vehicle may also be known as a driverless car, robot car, self-driving car or autonomous car.

The term "temporal images" of a region may refer to a series of images of the region captured at different time instants.

End of Definitions

A method, system, and computer program product are provided herein in accordance with an example embodiment for generating map data of a road segment associated with a region. In the example embodiments, the method, system, and computer program product disclosed herein may provide accurate lane data for a plurality of road segments in a region thereby leading to generation of updated map data for a map database. Therefore, embodiments of the present disclosure may provide highly reliable lane data that can be used for high-end applications such as but not limited to autonomous or self-driving vehicles.

The method, system, and computer program product disclosed herein further provide lane data associated with a road segment to an end user via any suitable navigation assistance device. The lane data associated with the road segment may include traffic data, the centre line of the lane, the width of the lane, or direction of travel of the road objects on the lane. In this way, a beneficiary of the map data can be provided with highly accurate navigation assistance based on the updated map data. These and other technical improvements of the invention will become evident from the description provided herein.

FIG. 1 illustrates a schematic diagram of a network environment 100 of a system 101 for generating the map data associated with a road segment of a region, in accordance with an example embodiment. Hereinafter the term "map data" refer to lane data of the road segment of the region. The system 101 may be communicatively coupled to one or more of a mapping platform 103, a service platform 109, a plurality of content providers 111a ... 111n, user equipment (UE) 113, an original equipment manufacturer (OEM) cloud 115 connected to UE 117, and a temporal image database 119, via a network 121. The mapping platform 103 may include a server 105 and a mapping database 107. Further, the server 105 and the mapping database 107 may be communicatively coupled to each other. The service platform 109 may comprise a plurality of services 109a ... 109n. The mapping platform 103 may be communicatively coupled to the service platform 109 and the plurality of content providers 111a ... 111n, via the network 121. Further, the service platform 109 and the plurality of content providers 111a ... 111n may be communicatively coupled to each other. In some example embodiments, the user equipment such as the user equipment 113 may be communicatively coupled to the mapping platform 103, directly via the network 121. Additionally or alternately, in some example embodiments, the user equipment such as the user equipment 117 may be communicatively connected to the OEM cloud 115 which in turn may be accessible to the mapping platform 103 via the network 121. The temporal image database 119 may comprise image data. All the components in the network environment 100 may be coupled directly or indirectly to the network 121. The components described in the network environment 100 may be further broken down into more than one component and/or combined together in any suitable arrangement. Further, one or more components may be rearranged, changed, added, and/or removed. Furthermore, fewer or additional components may be in communication with the system 101, within the scope of this disclosure.

The system 101 may be embodied in one or more of several ways as per the required implementation. For example, the system 101 may be embodied as a cloud based service or a cloud based platform. As such, the system 101 may be configured to operate outside the user equipment 113 and/or 117. However, in some example embodiments, the system 101 may be embodied within the user equipment 113 and/or 117, for example as part of an in-vehicle navigation system. In each of such embodiments, the system 101 may be communicatively coupled to the components shown in FIG. 1 to carry out the desired operations and wherever required modifications may be possible within the scope of the present disclosure.

The mapping platform 103 may comprise suitable logic, circuitry, interfaces and code that may be configured to store map data associated with the plurality of road objects and map features. The server 105 of the mapping platform 103 may comprise processing means and communication means. For example, the processing means may comprise one or more processors configured to process requests received from the system 101 and/or the user equipment 113, 117. The processing means may fetch map data from the mapping database 107 and transmit the same to the system 101 and/or the user equipment 113, 117 in a suitable format. In one or more example embodiments, the mapping platform 103 may periodically communicate with the user equipment 113 or 117 via the processing means to update a local cache of the map data stored on the user equipment 113, 117. Accordingly, in some example embodiments, map data may also be stored on the user equipment 113, 117 and may be updated based on periodic communication with the mapping platform 103.

The mapping database 107 of the mapping platform 103 may store map data of one or more geographic regions such as a city, province, and country or of the entire world. The mapping database 107 may store node data, road segment data, link data, point of interest (POI) data, link identification information, heading value records and the like. The mapping database 107 may also store cartographic data, routing data, and/or maneuvering data. According to some example embodiments, the road segment data records may be links or segments representing roads, streets, or paths, as may be used in calculating a route or recorded route information for determination of one or more personalized routes, or may record lane geometry associated with the respective road segment such as number of lanes, width of lane, direction of travel of the lane, etc. The node data may be end points corresponding to the respective links or segments of road segment data. The road link data and the node data may represent a road network, such as used by vehicles, cars, trucks, buses, motorcycles, and/or other entities. Optionally, the mapping database 107 may contain path segment and node data records, such as shape points or other data that may represent pedestrian paths, links or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The mapping database 107 may also store data about the POIs and their respective locations in the POI records. The mapping database 107 may additionally store data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the mapping database 107 may include event data (e.g., traffic incidents, construction activities, scheduled events, unscheduled events, accidents, diversions etc.) associated with the POI data records or other records of the mapping database 107. Optionally or additionally, the mapping database 107 may store 3D building maps data (3D map model of objects) of structures surrounding roads and streets.

The mapping database 107 may be a master map database stored in a format that facilitates updating, maintenance, and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the user equipment 113, and/or 117. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received map database in a delivery format to produce one or more compiled navigation databases.

As mentioned above, the mapping database 107 may be a master geographic database, but in alternate embodiments, the mapping database 107 may be embodied as a client-side map database and may represent a compiled navigation database that may be used in or with end user devices (such as user equipment 113, 117) to provide navigation and/or map-related functions. In such a case, the mapping database 107 may be downloaded or stored on the end user devices (such as user equipment 113, 117).

The services platform 109 may provide navigation related functions and the plurality of services 109a . . . 109n to the user equipment 113, 115. The plurality of services 109a . . . 109n may include navigation functions, speed adjustment functions, traffic related updates, weather related updates, warnings and alerts, parking related services and indoor mapping services. In accordance with an embodiment, the plurality of services 109a . . . 109n may be provided by the plurality of content providers 111a . . . 111n. In some examples, the plurality of content providers 111a . . . 111n may access various Software Development Kits (SDKs) from the services platform 109 for implementation of the plurality of services 109a . . . 109n. In accordance with an embodiment, the services platform 109 and the mapping platform 103 may be integrated into a single platform to provide a suite of mapping and navigation related applications for OEM devices, such as the user equipment 117. The user equipment 113, 117 may be configured to interface with the services platform 109, the plurality of content provider 111a . . . 111n, and the mapping platform 103 over the network 121. Thus, the mapping platform 103 and the services platform 109 may enable provision of cloud-based services for the user equipment 113, 117, such as, storing the sensor data in the OEM cloud 115 in batches or in real-time and retrieving the stored sensor data for determining boundary data of the top surface of each of the one or more objects.

The plurality of content providers 111a . . . 111n may be configured to maintain data stored in the mapping database 107. The plurality of content provider 111a . . . 111n such as a map developer may maintain the mapping platform 103. By way of example, the map developer may collect geographic data to generate and enhance the mapping platform 103. There may be different ways used by the map developer to collect data. These ways may include obtaining data from other sources, such as municipalities or respective geographic authorities. In addition, the map developer may employ field personnel to travel by vehicle along roads throughout the geographic region to observe features and/or record information about them, for example. Crowdsourcing of geographic map data may also be employed to generate, substantiate, or update map data. Also, remote sensing, such as aerial or satellite photography, may be used to generate map geometries directly or through machine learning as described herein.

The user equipment 113, 117 may be any user accessible device such as a mobile phone, a smartphone, a portable computer, and the like that is portable in itself or as a part of another portable/mobile object such as a vehicle. In some example embodiments, user equipment 113, 117 may be vehicles. Accordingly, hereinafter the user equipment 113, 117 may also be referred to as vehicles 113, 117. The user equipment 113, 117 may comprise a processor, a memory and a communication interface. The processor, the memory and the communication interface may be communicatively coupled to each other. In some example embodiments, the user equipment 113, 117 may be associated, coupled, or otherwise integrated with a vehicle of the user, such as an advanced driver assistance system (ADAS), a personal navigation device (PND), a portable navigation device, an infotainment system and/or other device that may be configured to provide route guidance and navigation related functions to the user. As such, the user equipment 113, 117 may be an autonomous semi-autonomous vehicle or a manually driven vehicle. In such example embodiments, the user equipment 113, 117 may comprise processing means such as a central processing unit (CPU), storage means such as on-board read only memory (ROM) and random access memory (RAM), acoustic sensors such as a microphone array, position sensors such as a GPS sensor, gyroscope, a LIDAR sensor, a proximity sensor, motion sensors such as accelerometer, a display enabled user interface such as a touch screen display, and other components as may be required for specific functionalities of the user equipment 113, 117 Additional, different, or fewer components may be provided. For example, the user equipment 113, 117 may be configured to execute and run mobile applications such as a messaging application, a browser application, a navigation application, and the like. At least the one user equipment such as the user equipment 113 may be directly coupled to the system 101 via the network 121. For example, the user equipment 113 may be a dedicated vehicle (or a part thereof) for gathering data for development of the map data in the mapping database 107. In some example embodiments, at least the one user equipment such as the user equipment 117 may be coupled to the system 101 via the OEM cloud 115 and the network 121. For example, the user equipment 113 may be a consumer vehicle (or a part thereof) and may be a beneficiary of the services provided by the system 101 and/or the mapping platform 103. In some example embodiments, one or more of the user equipment 113 and 117 may serve the dual purpose of a data gatherer and a beneficiary device.

The temporal image database 119 may be communicatively coupled with the system 101 via network 121. The temporal image database 119 may store image data of a region. The image data may be obtained from one or more imagery sources. In some example embodiments, the image data may refer to temporal images of the region taken from an aerial view. The imagery source may be a satellite imagery database which captures the images of some regions or entire surface of the earth. The image data obtained from the satellite imagery may comprise low resolution images. For example, but not limited to, each of the low-resolution images may corresponds to an image with resolution lower than or equal to 30 cm in which the lane data such as lane markings are not clearly visible as one pixel, where the lane markings in each of the low-resolution images correspond to greater than or equal to 30 cm on the ground. Lane markings on the ground usually are less than 30 cm wide, which means the lane markings in a 30 cm satellite image would be 1 pixel wide at the max, that too in case they are faded they are not even visible by human eye in such images.

Further, temporal image database 119 may store image data comprising low resolution images obtained from any suitable imagery sources such as one or more of fixed-wing aircraft, helicopters, unmanned aerial vehicles (UAVs or "drones"), balloons, blimps and dirigibles, rockets, kites, parachutes, stand-alone telescoping and vehicle-mounted poles. In some example embodiments, the image data may be obtained from any suitable imagery source which provides broader coverage but low resolution image data. In some example embodiments, the temporal image database 119 may be embodied in the mapping platform 103.

The network 121 may comprise suitable logic, circuitry, and interfaces that may be configured to provide a plurality of network ports and a plurality of communication channels for transmission and reception of data, map data from the mapping database 107, etc. Each network port may correspond to a virtual address (or a physical machine address) for transmission and reception of the communication data. For example, the virtual address may be an Internet Protocol Version 4 (IPv4) (or an IPv6 address) and the physical address may be a Media Access Control (MAC) address. The network 121 may be associated with an application layer for implementation of communication protocols based on one or more communication requests from at least one of the one or more communication devices. The communication data may be transmitted or received, via the communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

Examples of the network 121 may include, but is not limited to a wireless channel, a wired channel, a combination of wireless and wired channel thereof. The wireless or wired channel may be associated with a network standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a Long Term Evolution (LTE) networks (for e.g. LTE-Advanced Pro), 5G New Radio networks, ITU-IMT 2020 networks, a plain old telephone service (POTS), and a Metropolitan Area Network (MAN). Additionally, the wired channel may be selected on the basis of bandwidth criteria. For example, an optical fiber channel may be used for a high bandwidth communication. Further, a coaxial cable-based or Ethernet-based communication channel may be used for moderate bandwidth communication.

FIG. 2 illustrates a block diagram of the system 101 for generating map data of the region, in accordance with an example embodiment. The system 101 may comprise a processing means such as processor 201a, storage means such as memory 201b, and a communication means such as communication interface 201c. The processor 201a may retrieve computer program code instructions that may be stored in the memory 201b for execution of the computer program code instructions.

The processor 201a may be embodied in a number of different ways. For example, the processor 201a may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 201a may include one or more processing cores configured to perform independently. A multi-core processor may enable multiprocessing within a single physical package. Additionally or alternatively, the processor 201a may include one or more processors configured in tandem via the bus to enable independent execution of instructions, pipelining and/or multithreading. Additionally or alternatively, the processor 201a may include one or more processors capable of processing large volumes of workloads and operations to provide support for big data analysis. In an example embodiment, the processor 201a may be in communication with a memory 201b via a bus for passing information among components of the system 101.

The memory 201b may be non-transitory and may include, for example, one or more volatile and/or non-volatile memories. In other words, for example, the memory 201b may be an electronic storage device (for example, a computer readable storage medium) comprising gates configured to store data (for example, bits) that may be retrievable by a machine (for example, a computing device like the processor 201a). The memory 201b may be configured to store information, data, content, applications, instructions, or the like, for enabling the apparatus to carry out various functions in accordance with an example embodiment of the present invention. For example, the memory 201b could be configured to buffer input data for processing by the processor 201a. As exemplarily illustrated in FIG. 2, the memory 201b may be configured to store instructions for execution by the processor 201a. As such, whether configured by hardware or software methods, or by a combination thereof, the processor 201a may represent an entity (for example, physically embodied in circuitry) capable of performing operations according to an embodiment of the present invention while configured accordingly. Thus, for example, when the processor 201a is embodied as an ASIC, FPGA or the like, the processor 201*a* may be specifically configured hardware for conducting the operations described herein. Alternatively, as another example, when the processor 201*a* is embodied as an executor of software instructions, the instructions may specifically configure the processor 201*a* to perform the algorithms and/or operations described herein when the instructions are executed. However, in some cases, the processor 201*a* may be a processor specific device (for example, a mobile terminal or a fixed computing device) configured to employ an embodiment of the present invention by further configuration of the processor 201*a* by instructions for performing the algorithms and/or operations described herein. The processor 201*a* may include, among other things, a clock, an arithmetic logic unit (ALU) and logic gates configured to support operation of the processor 201*a*.

In some embodiments, the processor 201*a* may be configured to provide Internet-of-Things (IoT) related capabilities to users of the system 101 disclosed herein, such as, speed limit recommendations to the user or automatic speed adjustments for autonomous vehicles. The IoT related capabilities may in turn be used to provide smart city solutions by providing route selection updates, big data analysis, and sensor-based data collection by using the cloud based mapping system for providing navigation and route recommendation services to the autonomous delivery vehicle. In some embodiments, the system 101 may be configured to provide an environment for development of real time lane update recommendation and the best possible route selection strategy recommendation solutions for navigation systems in accordance with the embodiments disclosed herein. The environment may be accessed using the communication interface 201*c*.

The communication interface 201*c* may comprise input interface and output interface for supporting communications to and from any component with which the system 101 may communicate. The communication interface 201*c* may be any means such as a device or circuitry embodied in either hardware or a combination of hardware and software that is configured to receive and/or transmit data to/from a communications device. In this regard, the communication interface 201*c* may include, for example, an antenna (or multiple antennae) and supporting hardware and/or software for enabling communications with a wireless communication network. Additionally or alternatively, the communication interface 201*c* may include the circuitry for interacting with the antenna(s) to cause transmission of signals via the antenna(s) or to handle receipt of signals received via the antenna(s). In some environments, the communication interface 201*c* may alternatively or additionally support wired communication. As such, for example, the communication interface 201*c* may include a communication modem and/or other hardware and/or software for supporting communication via cable, digital subscriber line (DSL), universal serial bus (USB) or other mechanisms.

FIGS. 3A-3E respectively illustrate exemplary scenario representations 300, 310, 315, 320, and 325 of implementation of the system 101 with respect to a road segment and a plurality of road objects associated with a region, in accordance with an example embodiment of the disclosure. FIG. 3A-3E is described in conjunction with elements from FIG. 1 and FIG. 2.

FIG. 3A illustrates an exemplary representation 300 of an image of the road segment 330 of the region, in accordance with an embodiment of the disclosure. Hereinafter, for the illustrative purposes, the map data may include, but not limited to, lane data associated with the road segment 330.

In some example embodiments, the system 101 may obtain image data associated with the region from the temporal image database 119. The image data may comprise one or more temporal images of the region captured from an aerial view. The one or more temporal images may be captured using any suitable aerial imagery techniques. For example, the aerial imagery of the region may be captured using one or more of fixed-wing aircraft, helicopters, unmanned aerial vehicles (UAVs or "drones"), balloons, blimps and dirigibles, rockets, kites, parachutes, stand-alone telescoping and vehicle-mounted poles. However, the aforesaid techniques may capture the image data which is limited to a specific region. In some example embodiments, the image data may be captured using any suitable aerial imagery source which provides broader coverage. Generally, satellite imagery may capture images of entire globe or other planets collected by imaging satellites. The satellite imagery may capture low resolution images. The satellite imagery may also be readily available from a free source such as sentinel tools. Thus, the satellite imagery is a convenient source of the image data. Further, the sources of the satellite imagery may include, but not limited to, USGS EarthExplorer, ESA's Sentinel Mission, NOAA CLASS, NASA Earthdata Search, Earth Observation Link (EOLi), National Institute for Space Research (INPE), Bhuvan Indian Geo-Platform of ISRO, JAXA's Global ALOS 3D World, NOAA Data Access Viewer, VITO Vision, NOAA Digital Coast, Global Land Cover Facility, Digital Globe Free Product Samples, Geo-Airbus, or UNAVCO Research Data.

In some example embodiments, the image data captured from the satellite imagery may be stored in the temporal image database 119. For illustrative purposes herein, the image data may refer to the one or more temporal images of the region obtained from the satellite imagery. However, the image data may be obtained from any suitable imagery source which captures images of broader region (for example, images of the Earth). In some example embodiments, the system 101 may obtain latest image data, from the temporal image database 119. The latest image data may provide latest updates associated with the region. Further, the latest image data may also provide accurate information of the regions where continental drift may occur frequently. In some example embodiments, the system 101 may obtain image data that may include multiple temporal images with same resolution. Thus, the image data may be indicative of the one or more temporal images associated with the region captured from the same height and having same resolution. Therefore, dimensions of objects (for example, the road objects) in all the temporal images remain same.

In some example embodiments, the one or more temporal images associated with the region may be taken at different time instants. The one or more temporal images may be georeferenced. In some example embodiments, the temporal image database 119 may store the one or more temporal images and meta-data associated with the one or more temporal images. The meta-data of the one or more temporal images may be received from the imagery source. The meta-data of the one or more temporal images may comprise data associated with each image such as the location at which the image was captured. The meta-data may further comprise a size of the image, a format of the image, a color depth of the image, or an image resolution. In some example embodiments, the meta-data may also comprise longitude and latitude information associated with the image.

In some example embodiments, for illustrative purposes herein, the one or more temporal images of the region may be obtained which may be captured at different time instants.

The one or more temporal images may be obtained to determine a number of road objects associated with the road segment 330 of the region. The number of the road objects associated with the road segment 330 should be greater than a threshold number which is considered as a minimum number of road objects sufficient for analyzing a lane geometry of at least one lane associated with the road segment 330. Accordingly, in some example embodiments, if the system 101 may obtain at least one image comprising number of the road objects greater than the threshold number, then the system 101 is configured to determine the plurality of road objects associated with the region based on the at least one image.

In some example embodiments, the image data of the region may comprise several roads, vehicles, buildings or any other map objects. The system 101 may generate the lane data of each of the one or more road segments independently. Hereinafter, for illustrative purposes, the system 101 may generate the lane data associated with one road segment 330 of the region. However, similar techniques may be applied to generate the lane data of each of the one or more road segments associated with the region.

Referring to FIG. 3A, the centre line 305 of the road segment 330 associated with the region is illustrated. In some example embodiments, the centre line 305 may refer to reserved area that may separate opposing lanes of vehicle traffic on the road segment 330. In some example embodiments, the system 101 may determine the centre line 305 of the road segment 330 from the obtained image of the road segment 330 from the imagery source such as a satellite. In some example embodiments, the center line 305 may indicate that either side of the divider may comprise the plurality of road objects as a plurality of road objects 301a . . . 301n, and 303a . . . 303n which are travelling in opposite directions. In an alternate embodiment, the system 101 may determine the centre line 305 based on a determination of half of a distance between a location of right most vehicle 301b traversing with first direction of travel in left portion 306a of the road segment 330 and a location of left most vehicle 303b traversing with second direction of travel in right portion 306b of the road segment 330. The first direction of travel is opposite to the second direction of travel. The position of the half of the determined distance corresponds to a point lying on the centre line 305 and a straight vertical line passing through the point corresponds to the centre line 305.

FIG. 3B illustrates an exemplary scenario 310 depicting implementation of the system 101 to rotate an image 300a of the road segment 330 associated with the region, to make the centre line 305 of the road segment 330 parallel to a vertical axis of an image coordinate space of the image 300a, in accordance with an embodiment of the disclosure. In some example embodiments, the system 101 may rotate the image 300a of the road segment 330 such that the center line 305 of the road segment 330 is parallel to the vertical axis of the image coordinate space of the image 300a. However, the system 101 may rotate the road segment 330 to any suitable angle. The system 101 may maintain the georeferenced information associated with the road segment 330, after the rotation of the road segment 330.

FIG. 3C illustrates an exemplary representation 315 of a plurality of temporal images (300b, 300c and 300d) of road segment 330 associated with the region at different time instants, in accordance with an example embodiment of the present disclosure. As shown in the FIG. 3C, the temporal images (300b, 300c and 300d) comprises one or more road objects (301a . . . 301n and 303a . . . 303n) associated with the road segment 330. A resolution of the temporal images (300b, 300c and 300d) is preferably identical. Referring to FIG. 3C, the temporal images (300b, 300c and 300d) are captured from the same height. The identical resolution of the temporal images (300b, 300c and 300d) may provide identical information (such as width of the road segment 330, size of the road objects 301a . . . 301n) of the road segment 330 in all the temporal images (300b, 300c and 300d). For illustrative purposes herein, the plurality of road objects 301a . . . 301n are shown to be travelling in a direction opposite to that of the direction of the plurality of road objects 303a . . . 303n. In some example embodiments, the plurality of road objects 301a . . . 301n may travel on same lanes or on different lanes. Similarly, the plurality of road objects 303a . . . 303n may travel on same lanes or on different lanes. In some example embodiments, the vehicles may include but not limited to autonomous vehicles, manual vehicles or semi-autonomous vehicles. In some example embodiments, each lane of the road segment 330 may be restricted to a particular speed. For example, heavy vehicles may travel on slow moving lane of the road segment 330. Further, the four-wheelers such as cars, or SUVs may travel on fast moving lane of the road. Furthermore, the vehicles travelling on the road may change their respective lanes at any time.

In some example embodiments, the system 101 may determine a plurality of mobile road objects 301a . . . 301n, and 303a . . . 303n from the plurality of road objects 301a . . . 301n and 303a . . . 303n on the road segment 330, based on at least one object detection technique. Hereinafter, the term mobile road objects and the road object are interchangeably used. The term mobile road objects or the road objects may refer to a traveler such as vehicles or pedestrians on the road segment 330. In some example embodiments, the system 101 may employ computer vision technique to detect the plurality of mobile road objects 301a . . . 301n, and 303a . . . 303n in the road segment 330.

In some example embodiments, the system 101 may use the computer vision based object detection techniques such as Viola-Jones object detection framework based on Haar features, Scale-invariant feature transform (SIFT), or Histogram of oriented gradients (HOG) features. In an alternative embodiment, the system 101 may use deep machine learning-based object detection technique such as Region Proposals R-CNN, Fast R-CNN, Faster R-CNN, Single Shot MultiBox Detector (SSD), or You Only Look Once (YOLO). However, the system 101 may employ any suitable object detection techniques to determine one or more mobile road objects 301a . . . 301n, and 303a . . . 303n.

In some example embodiment, for illustrative purposes, referring to FIG. 3C, the system 101 may employ the object detection technique as YOLO V3, to determine the plurality of road objects 301a . . . 301n, 303a . . . 303n associated with the road segment 330. The YOLO V3 object detection technique may involve various steps such as object recognition, image classification and object localization for processing the image associated with the road segment 330. The image classification may involve predicting the class of plurality of road objects 301a . . . 301n, 303a . . . 303n in the image associated with the road segment 330. The object localization may include identifying the location of plurality of road objects 301a . . . 301n, 303a . . . 303n in the image (for example one of the image 300b, 300c or 300d) associated with the road segment 330. The object localization may include drawing a bounding box around an extent of the plurality of the road objects 301a . . . 301n, 303a . . . 303n.

The advantage of using YOLO V3 is that, it is incredibly fast and processes multiple frames per second.

Referring to FIG. 3C, the one or more temporal images (300b, 300c or 300d) of the road segment 330 may be taken at different time instances. Each image (300b, 300c or 300d) associated with the road segment 330 may comprise the plurality of road objects 301a . . . 301n, 303a . . . 303n. For example, referring to FIG. 3C, the image (for example image 300b) of the road segment 330 may be captured during peak hours during which maximum traffic congestion may be occurred on the road segment 330. In some example embodiments, the image (for example image 300c) of the road segment 330 may be captured during normal hours, during which medium traffic congestion may be occurred. In some example embodiments, the image (for example image 300d) of the road segment 330 may be captured during non-peak hours, during which minimum traffic congestion may be occurred. Referring to FIG. 3C, the one or more temporal images (300b, 300c and 300d) may provide sufficient information of the road objects 301a . . . 301n, 303a . . . 303n associated with the road segment 330 at different time instants.

FIG. 3D illustrates an exemplary scenario 320 for depicting implementation of the system 101 to determine a traversing direction of the road objects in the road segment 330, in accordance with an embodiment of the disclosure. In some example embodiments, the system 101 may determine a traversing direction of the plurality of the road objects 301a . . . 301n, 303a . . . 303n using any suitable machine learning-based object detection technique. For illustrative purposes Although FIG. 3D has been explained with reference to two road objects (301a and 303a), however it may be contemplated that the disclosed technique may be applicable for any number and type of road objects in the road segment 330. Referring to FIG. 3D, the road object 301a may indicate traversing in forward direction with respect to the centerline of the road in the image and the road object 303a may indicate traversing in backward direction (a direction opposite to the direction of the object 301a) with respect to the centerline of the road in the image by detecting a position of front side/driver side of each of the road object 301a and the road object 303a. In an example embodiment, the system 101 may obtain geographical directional data (interchangeably referred as "compass data") respective to the road segment 330 in the image. The compass data may be received along with the satellite images. The geographical directional data may comprise information indicating a heading of the respective road segment 300 which may be defined with respect to one or more of geographical north, geographical south, geographical east, geographical west. The system 101 may align the image with respect to the compass data, and determine that the forward direction corresponds to the direction of the heading of the road segment 300 and the backward direction corresponds to the direction opposite to the direction of the heading of the road segment 300. For example, but not limiting to, if the heading of the road segment 300, as obtained from the geographical direction data, is geographical north then the forward direction is also along the geographical north, and the backward direction is along the geographical south (i.e. opposite to the geographical north).

FIG. 3E illustrates an exemplary scenarios 325 depicting an implementation of the system 101 to convert the road objects 301a . . . 301n, 303a . . . 303n into their respective center points 307a . . . 307n, 309a . . . 309n, in accordance with an embodiment of the disclosure. In an example embodiment, the system 101 may superimpose or overlay the one or more temporal images (for example images 300b, 300c, and 300d) of the road segment 330 into a single superimposed image 300x. Referring to FIG. 3E, the superimposed image 300x of the road segment 330 may represent the plurality of road objects 301a . . . 301n, 303a . . . 303n associated with the road segment 330 travelling over a particular period of time. In an example embodiment, the system 101 may determine the centre points 307a . . . 307n, 309a . . . 309n of each of the plurality of road objects 301a . . . 301n, 303a . . . 303n associated with the road segment 330 and overlay the centre points 307a . . . 307n, 309a . . . 309n of each of the plurality of road objects 301a . . . 301n, 303a . . . 303n as shown in the image 300y. Further, the system 101 may replace the plurality of road objects 301a . . . 301n, 303a . . . 303n with their respective centre points 307a . . . 307n, 309a . . . 309n as shown in image 300z.

FIG. 4 illustrates an exemplary scenario 400 for implementation of the system 101 to generate at least one cluster corresponding to the road segment 330, in accordance with an embodiment of the disclosure. In an example embodiment, the system 101 plots all the centre points 307a . . . 307n, 309a . . . 309n of each of the plurality of road objects 301a . . . 301n, 303a . . . 303n on an axis that may be orthogonal with respect to the at least one direction of travel associated with the at least on road segment 330. The system 101 generates clusters 401a . . . 401n, 403a . . . 403n of the centre points 307a . . . 307n, 309a . . . 309n of each of the plurality of road objects 301a . . . 301n, 303a . . . 303n on the axis. The number of such generated clusters 401a . . . 401n, 403a . . . 403n corresponds to the number of lanes of the road segment 330. Each cluster of the generated clusters 401a . . . 401n, 403a . . . 403n corresponds to each respective lane associate with the at least one road segment 330. The clusters 401a . . . 401n, 403a . . . 403n may comprise collection of the centre points 307a . . . 307n, 309a . . . 309n of each of the plurality of road objects 301a . . . 301n, 303a . . . 303n on the axis.

The system 101 may generate the clusters 401a . . . 401n, 403a . . . 403n using any suitable clustering algorithm. In a non-limiting example, the system 101 may employ at least one of a hierarchical clustering, a centroid clustering algorithm such as k-means clustering, a density-based clustering. The system 101 may use any suitable clustering algorithms to generate the clusters 401a . . . 401n, 403a . . . 403n of the centre points 307a . . . 307n, 309a . . . 309n.

In another example embodiment, the system 101 may employ density-based spatial clustering of applications with noise (DBSCAN) algorithm to generate the clusters 401a . . . 401n, 403a . . . 403n by grouping a set of centre points 307a . . . 307n, 309a . . . 309n that are closely packed together based on measurement of a Euclidean distance, and marking another set of centre points 307a . . . 307n, 309a . . . 309n as outliers points that lie alone in low-density regions (whose nearest neighbors are too far away).

In an example embodiment, the system 101 may determine a lane count associated with the road segment 330 based on a count of the clusters 401a . . . 401n, 403a . . . 403n. For example, a total number of clusters may be determined as 10, then the road segment 330 may comprise a lane count of 10 (i.e. the road segment 330 may include 10 lanes). For illustrative purpose, five clusters are shown on each side of the centerline 305 of the road segment 330, however it shall be apparent to a person ordinary skilled in the art that the present invention stays true for a number of clusters or lanes more or less than five. In an example embodiment, the system 101 may determine a mean value of each cluster of the clusters 401a . . . 401n and the clusters 403a . . . 403n.

FIG. 5 illustrates an exemplary scenario 500 for implementation of the system 101 to generate centre lines of the lanes associated with the road segment 330 of the region, in accordance with an example embodiment of the disclosure. The system 101 may determine centre lines 501a . . . 501n, 503a . . . 503n of respective lanes 505a . . . 505n, and 507a . . . 507n by determining mean value (i.e. value of a mean position/centre point of each cluster) of each of the clusters 401a . . . 401n, 403a . . . 403n. The mean value/centre point of each cluster on the axis corresponds to a location of centre line of a respective lane on the axis. The system 101 may further, determine centre lines 501a . . . 501n, 503a . . . 503n corresponds to the respective lanes 505a . . . 505n, and 507a . . . 507n of the road segment 330. As shown in the FIG. 5, the centerline 501n of the lane 505n corresponds to the mean value of cluster 401n. Similarly, the centerline 503n of the lane 507n corresponds to the mean of value cluster 403n. The lane 505n and the lane 507n are present on different sides of the centerline 305 of the road. Accordingly, the system 101 may determine centre lines of the all the lanes 505a . . . 505n, and 507a . . . 507n associated with the road segment 330 using similar techniques as described in FIG. 5.

In an example embodiment, the system 101 may determine a width of each lane of the lanes 505a . . . 505n, and 507a . . . 507n based on the corresponding centre line of the respective lane associated with the road segment 330. Assuming that the all lanes 505a . . . 505n, and 507a . . . 507n of the road segment 330 have uniform characteristics such as uniform width. The system 101 may determine the width of a lane in the road segment 330 based on a distance between a centre line of the respective lane and a centre line of another lane adjacent to the respective lane. For example, but not limited to, the system 101 determines a width of lane 505a by determining a distance between the centre line 501a of the lane 505a and the centre line 501b (not shown in the figure) of the lane 501b (not shown in the figure). The width of the lane is equivalent to the determined distance between the centre line of the lane and the centre of the adjacent lane of the respective lane. The system 101 may determine the distance based on space coordinates of the centre points/mean value of the respective clusters. It shall be noted that the present disclosure is not limited to above-explained method for determination of the width of the lane, and other known techniques to determine the width may also be used without limiting or diverting the scope of the present invention.

In some example embodiments, In an example embodiment, the system 101 may determine a width of the road segment 330 based on centre points of the road objects 301a . . . 301n, 303a . . . 303n captured in an image of the road segment 330 in busiest hour of the day (i.e. maximum traffic is present on the road segment 330). The system 101 may plot the centre points of the respective road objects 301a . . . 301n, 303a . . . 303n associated with the road segment 330 in a horizontal axis. Further, the system 101 may identify the leftmost centre point and the rightmost centre point on the horizontal axis. The system 101 may determine the width of the road segment 330 based on a distance between the leftmost centre point and the rightmost centre point associated with road segment 330. Additionally, the system 101 may determine the centerline 305 of the road segment 330 by determining a point on the road segment 330 where direction of travel of the road objects 301a . . . 301n, 303a . . . 303n changes in direction the direction of travel of the road objects. The direction of travel of the road objects 301a . . . 301n, 303a . . . 303n may be determined based on a displacement of position of the respective road objects 301a . . . 301n, 303a . . . 303n on the road segment 330. The system 101 may also determine a direction of travel of a lane based on direction of travel of a road object which is determined based on a direction of a front portion/driver portion of the road object, for example, but not limiting to, the road object is car so a direction of travel of the car can be identified based on the direction of front bonnet of the car.

In some example embodiment, the generated lane data may be used to directly or indirectly navigate a vehicle. The user equipment 113, 117 may be integrated into an autonomous vehicle or a highly assisted driving (HAD) or the plurality of road objects. The user equipment 113 may access the lane data from the system 101 via network 121. The user equipment 117 may access the lane data directly from the OEM cloud 115. The user equipment 113, 117 may act as a navigation system for an autonomous road object or the HAD. The user equipment 113, 117 may comprise high definition HD maps which allow highly automated road objects to precisely locate themselves on the road based on the generated lane data. The generated lane data associated with the road segment 330 comprise at least one of the traffic data associated with lane, the centre line of the lane, the width of the lane, or a direction of travel of the road objects on the lane. The traffic data associated with a lane indicates a maximum traffic the lane can pass through.

FIG. 6 illustrates a data format 600 for the generated lane data associated with the road segment 330 of the region. The data format may be a tabular form, in a non-limiting manner, indicating specific entries associated with the lane data in separate columns. For example, the data format illustrated in FIG. 6 comprises information of the total number of lanes on each side (left side and right side respectively) of the road centre line 305 of the road segment 330 and represented as an entry 'Number of lanes' 601. Further, the width of the each lane associated with the road segment 330 is represented as an entry "Lane width" 603. A traversing direction or direction of travel associated with the lane is represented as "traversing direction" 605. The lane data thus generated in the data format illustrated herein may be transmitted to a data source such as the mapping platform 103 of FIG. 1 for storage or update. In this way the system 101 may generate lane data in a region and indicate the same to the mapping platform 103 for suitable end users.

The system 101 provides improved accuracy in generating the lane data. The system 101 may obtain lane data accurately from the low resolution satellite images. Further, the satellite imagery has an advantage of broader coverage of the entire globe. The system 101 may determine the road objects 301a . . . 301n, 303a . . . 303n based on the neural network which reduces the required computational resources such as CPU, GPU and memory.

FIG. 7 illustrates a flowchart for implementation of an exemplary method 700 for generating map data of a region, in accordance with an embodiment. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described may be embodied by computer program instructions. In this regard, the computer program instructions which embody the described procedures may be stored by a memory device of an apparatus employing an embodiment of the present invention and executed by a processor of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

At 701, the method comprises obtaining image data of the region. The image data may be obtained from mapping database 107 of the mapping platform 103. The image data of the region may include one or more temporal images of a plurality of road objects traversing on the road segment 330.

At 703, the method may comprise determining, based on the image data, the plurality of road objects corresponding to at least one road segment associated with the region. The method further comprises determining a plurality of mobile road objects from the plurality of road objects on the at least one road segment based on at least one object detection technique. The mobile road objects may include vehicles or pedestrians.

At 705, the method may further comprise generating at least one cluster 401, of road objects corresponding to the at least one road segment, based on the plurality of road objects. The method further comprises determining a centre point 307 of each of the plurality of road objects. The method may further comprises plotting the centre point 307 of each of the plurality of road objects on an axis orthogonal with respect to the at least one direction of travel associated with the at least one road segment. The at least one cluster is generated from the plotted centre point of each of the plurality of road objects based on a clustering algorithm. The method further comprises determining a lane count associated with the at least one road segment based on a count of the at least one cluster.

At 707, the method comprises generating map data of the region based on the at least one cluster 401, 403 of road objects. The map data comprises lane data associated with at least one lane of the at least one road segment.

In an example embodiment, the system 101 for performing the method 700 described above may comprise a processor (e.g. the processor 201a) configured to perform some or each of the operations 701-707 described above. The processor may, for example, be configured to perform the operations 701-707 by performing hardware implemented logical functions, executing stored instructions, or executing algorithms for performing each of the operations. Alternatively, the system 101 may comprise means for performing each of the operations described above. In this regard, according to an example embodiment, examples of means for performing operations 701-707 may comprise, for example, the processor 201a and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A system for generating map data of a region, the system comprising:
    a memory configured to store instructions; and
    one or more processors configured to execute the instructions to:
        obtain image data of the region;
        determine, based on the image data, a plurality of road objects corresponding to at least one road segment associated with the region, wherein the plurality of road objects are selected from the group consisting of vehicles, hawkers, and pedestrians;
        generate at least one cluster of road objects corresponding to the at least one road segment, based on the plurality of road objects;
        generate the map data of the region based on the at least one cluster of road objects; and
        determine a centre point of each of the plurality of road objects and plot the centre point of each of the plurality of road objects on an axis that is orthogonal with respect to the at least one direction of travel associated with the at least one road segment.

2. The system of claim 1, wherein to determine the plurality of road objects, the one or more processors are further configured to determine a plurality of mobile road objects from the plurality of road objects on the at least one road segment, based on at least one object detection technique.

3. The system of claim 2, wherein the one or more processors are further configured to:
    determine a front portion of the plurality of mobile road objects associated with the respective lane; and
    determine a direction of travel of the respective lane based on direction of travel of the front portion of the plurality of mobile road objects traversing on the respective lane.

4. The system of claim 1, wherein the at least one cluster is generated from the plotted centre point of each of the plurality of road objects based on a clustering algorithm.

5. The system of claim 4, wherein the one or more processors are further configured to determine a lane count associated with the at least one road segment based on a count of the at least one cluster.

6. The system of claim 1, wherein the map data comprises lane data associated with at least one lane of the at least one road segment.

7. The system of claim 6, wherein to generate the map data, the one or more processors are further configured to:
   determine a mean value of the at least one cluster;
   determine a centre line corresponding to the mean value of each of the at least one cluster, wherein each centre line corresponds to a respective lane of the road segment; and
   determine a width of each respective lane based on the corresponding centre line.

8. The system of claim 1, wherein lane data associated with at least one lane of the road segment comprises at least one of the centre line of the at least one lane, the width of the at least one lane, or a direction of travel of the at least one lane.

9. A method for generating map data of a region, the method comprising:
   obtaining image data of the region;
   determining, based on the image data, a plurality of road objects corresponding to at least one road segment associated with the region, wherein the plurality of road objects are selected from the group consisting of vehicles, hawkers, and pedestrians;
   generating at least one cluster of road objects corresponding to the at least one road segment, based on the plurality of road objects;
   generating the map data of the region based on the at least one cluster of road objects; and
   determining a centre point of each of the plurality of road objects and plotting the centre point of each of the plurality of road objects on an axis that is orthogonal with respect to the at least one direction of travel associated with the at least one road segment.

10. The method of claim 9, wherein determining the plurality of road objects further comprises determining a plurality of mobile road objects from the plurality of road objects on the at least one road segment based on at least one object detection technique.

11. The method of claim 10, further comprising:
   determining a front portion of the plurality of mobile road objects associated with the respective lane; and
   determining a direction of travel of the respective lane based on direction of travel of the front portion of the plurality of mobile road objects traversing on the respective lane.

12. The method of claim 9, wherein the at least one cluster is generated from the plotted centre point of each of the plurality of road objects based on a clustering algorithm.

13. The method of claim 12, further comprising determining a lane count associated with the at least one road segment based on a count of the at least one cluster.

14. The method of claim 9, wherein the map data comprises lane data associated with at least one lane of the at least one road segment.

15. The method of claim 14, wherein generating the map data further comprises:
   determining a mean value of the at least one cluster;
   determining a centre line corresponding to the mean value of each of the at least one cluster, wherein each centre line corresponds to a respective lane of the road segment; and
   determining a width of each respective lane based on the corresponding centre line.

16. A non-transitory computer readable medium having stored thereon, computer-executable instructions for causing a computer to execute operations for generating map data of a region, the operations comprising:
   obtaining image data of the region;
   determining, based on the image data, a plurality of road objects corresponding to at least one road segment associated with the region, wherein the plurality of road objects are selected from the group consisting of vehicles, hawkers, and pedestrians;
   generating at least one cluster of road objects corresponding to the at least one road segment, based on the plurality of road objects;
   generating the map data of the region based on the at least one cluster of road objects; and
   determining a centre point of each of the plurality of road objects and plotting the centre point of each of the plurality of road objects on an axis that is orthogonal with respect to the at least one direction of travel associated with the at least one road segment.

* * * * *